United States Patent
Ma et al.

(10) Patent No.: US 7,445,371 B2
(45) Date of Patent: Nov. 4, 2008

(54) BACKLIGHT MODULE WITH FRAME HAVING SIDE OPENING AND COOPERATIVE SLIDING GUIDE AND LIQUID CRYSTAL DISPLAY WITH SAME

(75) Inventors: Xiao-Ping Ma, Shenzhen (CN); Wen-hui Yao, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 26 days.

(21) Appl. No.: 11/642,065

(22) Filed: Dec. 20, 2006

(65) Prior Publication Data

US 2007/0147091 A1    Jun. 28, 2007

(30) Foreign Application Priority Data

Dec. 23, 2005   (TW)   .............................. 94146284 A

(51) Int. Cl.
*F21V 7/04* (2006.01)

(52) U.S. Cl. .................. 362/633; 362/628; 362/632

(58) Field of Classification Search ................ 362/362, 362/602, 612, 613, 628, 632, 633, 634; 349/58, 349/65
See application file for complete search history.

(56) References Cited

U.S. PATENT DOCUMENTS

| 6,445,373 | B1 * | 9/2002 | Yamamoto | .................. 349/58 |
| 6,961,103 | B2 | 11/2005 | Sung et al. | |
| 2002/0126470 | A1 * | 9/2002 | Saito et al. | .................. 362/633 |
| 2006/0227572 | A1 * | 10/2006 | Chen | .......................... 362/633 |

* cited by examiner

*Primary Examiner*—Y My Quach Lee
(74) *Attorney, Agent, or Firm*—Wei Te Chung

(57) ABSTRACT

An exemplary backlight module (12) includes a light guide plate (14) and a frame (16) receiving the light guide plate. The frame includes a first side wall (160), and a second side wall (167) connected with the first side wall. The frame further defines a first sliding guide (165). The first side wall defines an opening (163) therein. The opening is configured for allowing the light guide plate to be inserted into the frame therethrough. The first sliding guide is defined at an inner side of a portion of the frame that is adjacent to the second side wall, and supports one side of the light guide plate. The first sliding guide communicates with the opening, and is configured for allowing the light guide plate to slide into the frame.

20 Claims, 3 Drawing Sheets

BACKLIGHT MODULE WITH FRAME HAVING SIDE OPENING AND COOPERATIVE SLIDING GUIDE AND LIQUID CRYSTAL DISPLAY WITH SAME

FIELD OF THE INVENTION

The present invention relates to backlight modules such as those used in liquid crystal displays (LCDs), and more particularly to a backlight module with a frame that has a side opening and at least one cooperative sliding guide.

GENERAL BACKGROUND

Liquid crystal displays are commonly used as displays for compact electronic apparatuses, because they not only provide good quality images with little power but are also very thin. The liquid crystal in a liquid crystal display does not emit any light itself. The liquid crystal has to be lit by a light source so as to clearly and sharply display text and images. Thus, a backlight module is generally needed for a liquid crystal display.

Referring to FIG. 3, a typical backlight module 30 includes a light guide plate (LGP) 32, and a frame 34 receiving the light guide plate 32. The light guide plate 32 has a generally rectangular shape, and includes a first side surface 322, and a second side surface 324 opposite to the first side surface 322. A first ear 326 outwardly extends from the first side surface 322. Two second ears 328 outwardly extend from the second side surface 324. The frame 34 defines a first notch 342, and two second notches 344. The first notch 342 is defined in a first side (not labeled) of the frame 34, and corresponds to the first ear 326 of the light guide plate 32. The second notches 344 are defined in a second side (not labeled) on an opposite side of the light guide plate 32 to the first side, and are positioned corresponding to their corresponding second ears 328 of the light guide plate 32.

When the backlight module 30 is assembled, the light guide plate 32 is received in the frame 34. The first ear is 326 is received in the first notch 342, and the second ears 328 are respectively received in the second notches 344. Thereby, the light guide plate 32 is received and supported by the frame 34.

In the process of assembly of the backlight module 30, the first ear 326 and the second ears 328 are generally pressed into the first notch 342 and the second notches 344 respectively by force. This may result in the frame 34 being distorted or even damaged. When this occurs, the mechanical stability and the performance of the backlight module 30 are liable to be impaired.

What is needed, therefore, is a backlight module that can overcome the above-described deficiency. What is also needed is a liquid crystal display including the backlight module.

SUMMARY

In one preferred embodiment, a backlight module includes a light guide plate and a frame receiving the light guide plate. The frame includes a first side wall, and a second side wall connected with the first side wall. The frame further defines a sliding guide. The first side wall defines an opening therein. The opening is configured (i.e., structured and arranged) for allowing the light guide plate to be inserted into the frame therethrough. The sliding guide is defined at an inner side of a portion of the frame that is adjacent to the second side wall, and supports one side of the light guide plate. The first slide guide communicates with the opening and is configured for allowing the light guide plate to slide into the frame.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
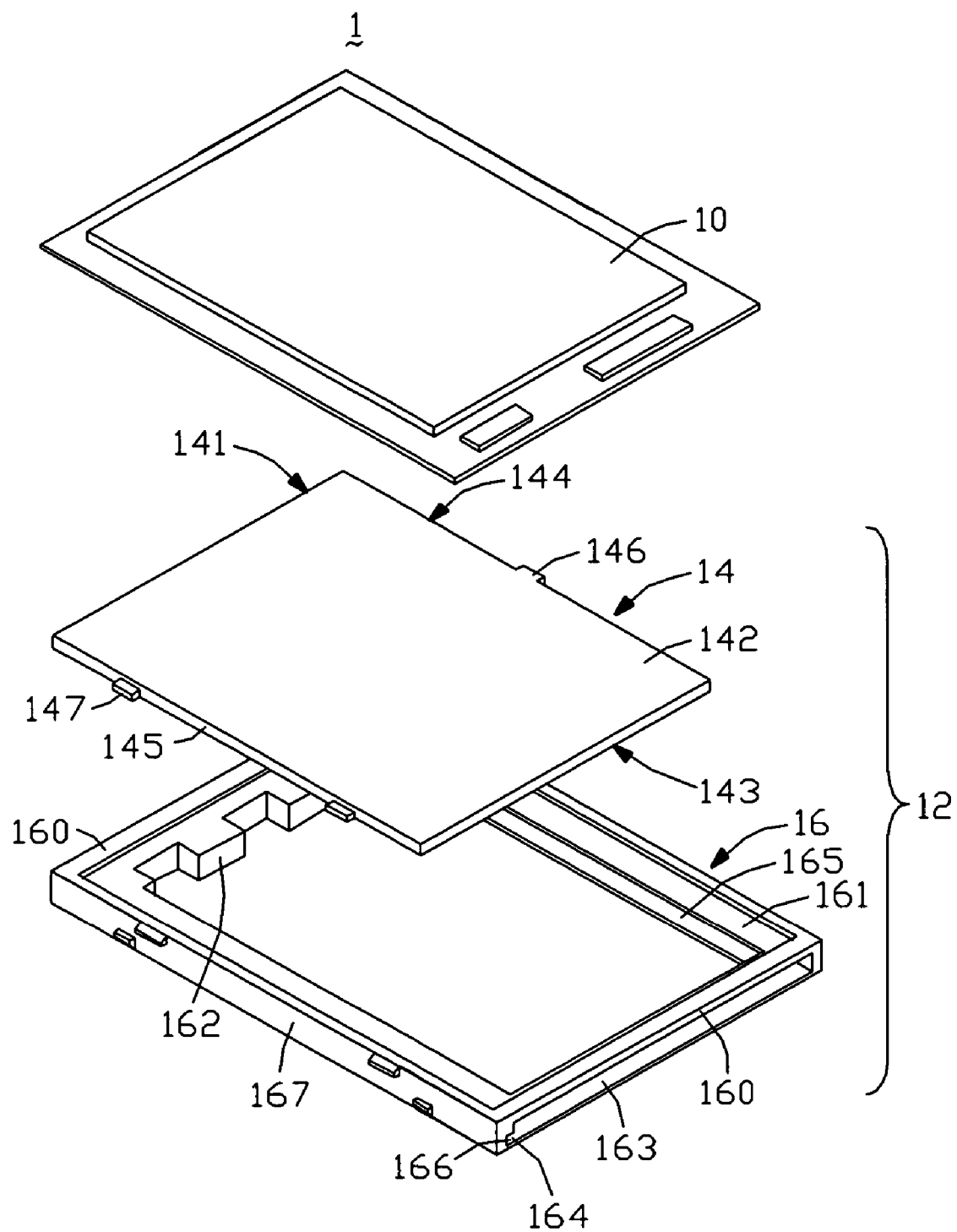
FIG. 1 is an exploded, isometric view of a liquid crystal display according to a first embodiment of the present invention.

Referring to FIG. 1, a liquid crystal display 1 according to a first embodiment of the present invention is shown. The liquid crystal display 1 includes a liquid crystal panel 10, and a backlight module 12 located adjacent to the liquid crystal panel 10.

The backlight module 12 includes a light guide plate 14, and a frame 16 receiving the light guide plate 14. The light guide plate 14 includes a light incident surface 141, a light emitting surface 142, a bottom surface 143, a first side surface 144, and a second side surface 145. The light emitting surface 142 is perpendicularly connected with the light incident surface 141. The bottom surface 143 is on an opposite side of the light guide plate 14 to the light emitting surface 142. The first side surface 144 and the second side surface 145 are on opposite sides of the light guide plate 14 to each other, and are perpendicularly connected with the light incident surface 141, the light emitting surface 142, and the bottom surface 144. That is, the light incident surface 141, the first side surface 144, and the second side surface 145 are positioned between the light emitting surface 142 and the bottom surface 143.

A first ear 146 outwardly extends from the first side surface 144, and is located adjacent to a middle portion (not labeled) of the first side surface 144. In the illustrated embodiment, the first ear 146 has a top portion coplanar with the light emitting surface 142, and a bottom portion coplanar with the bottom surface 143. That is, the first ear 146 is as thick as a main body (not labeled) of the light guide plate 14. Two second ears 147 outwardly extend from the second side surface 145, and are each positioned adjacent to their respective end portions (not labeled) of the second side surface 145. Each of the second ears 147 has a bottom portion coplanar with the bottom surface 143, and is half as thick as the main body of the light guide plate 14. The light guide plate 14 can be made from polycarbonate (PC) or polymethyl methacrylate (PMMA), and can be manufactured using an injection molding method.

The frame 16 has a substantially rectangular shape, and includes two first side walls 160 located opposite to each other, two second side walls 167 located opposite to each other, and a supporting board 161. The first side walls 160 and the second side walls 167 are connected end to end, and first side walls 160 are essentially perpendicular to the second side walls 167. The supporting board 161 is generally frame-shaped, and integrally adjoins inner surfaces (not labeled) of the first side walls 160 and the second side walls 167. Thus the frame 16 defines a generally rectangular space (not labeled) for accommodating the light guide plate 14 and supporting the liquid crystal panel 10. Three protrusions 162 are formed adjacent to one of the first side walls 160 at the supporting board 161. The protrusions 162 extend into the space, and are parallel to each other, thereby defining four recesses (not labeled). The backlight module 12 further includes four point illuminators (not shown) such as light emitting diodes (LEDs), which cooperatively serve as a light source for the backlight module. The point illuminators are respectively positioned in the recesses.

The frame 16 further defines a first opening 163, a second opening 164, a first sliding guide 165, and a second sliding guide 166. The first opening 163 and the second opening 164 are defined in the other first side wall 160 opposite to the protrusions 162. A height of the first opening 163 is slightly greater than the thickness of the main body of the light guide plate 14, and a width of the first opening 163 is slightly greater than a total width of the main body of the light guide plate 14 and the first ear 146. A height of the second opening 164 is slightly greater than the thickness of the second ear 147, and a width of the second opening 164 is slightly greater than a width of the second ear 147. In an alternative embodiment, the height of the second opening 164 can be equal to that of the first opening 163.

The first sliding guide 165 and the second sliding guide 166 are defined in two opposite sides of the supporting board 161 adjacent to the second side walls 167 respectively. The first sliding guide 165 is substantially rectangular, and communicates with the first opening 163. A width of the first sliding guide 165 is substantially equal to that of the first opening 163. The second sliding guide 166 is substantially rectangular, and communicates with the second opening 164. A width of the second sliding guide 166 is substantially equal to that of the second opening 164. The frame 16 is preferably made from polycarbonate, plastic, or another suitable material.

The light guide plate 14 can be attached in the frame 16 according to the following steps. First, the light guide plate 14 is aligned with the first opening 163 and the second opening 164 of the frame 16. The light incident surface 141 faces the first opening 163. The second ears 147 are aligned with the second opening 164. Second, the light guide plate 14 is pushed into the frame 16 through the first opening 163 and the second opening 164. The first ear 146 slides in the first sliding guide 165, and the second ears 147 slide in the second sliding guide 166. When the light incident surface 141 contacts the protrusions 162, the light guide plate 14 is completely received in the frame 16. The first opening 163 and the second opening 164 are sealed by a curved end portion of a reflective film (not shown) located adjacent to the bottom surface 143 of the light guide plate 14.

The light guide plate 14 is attached in the frame 16 by sliding motion instead of by forcible pressing. Therefore distortion of the frame 16 can be avoided. Thus the backlight module 12 can be safely assembled or disassembled such that the mechanical stability and performance of the backlight module 12 is maintained.

Figure 2:
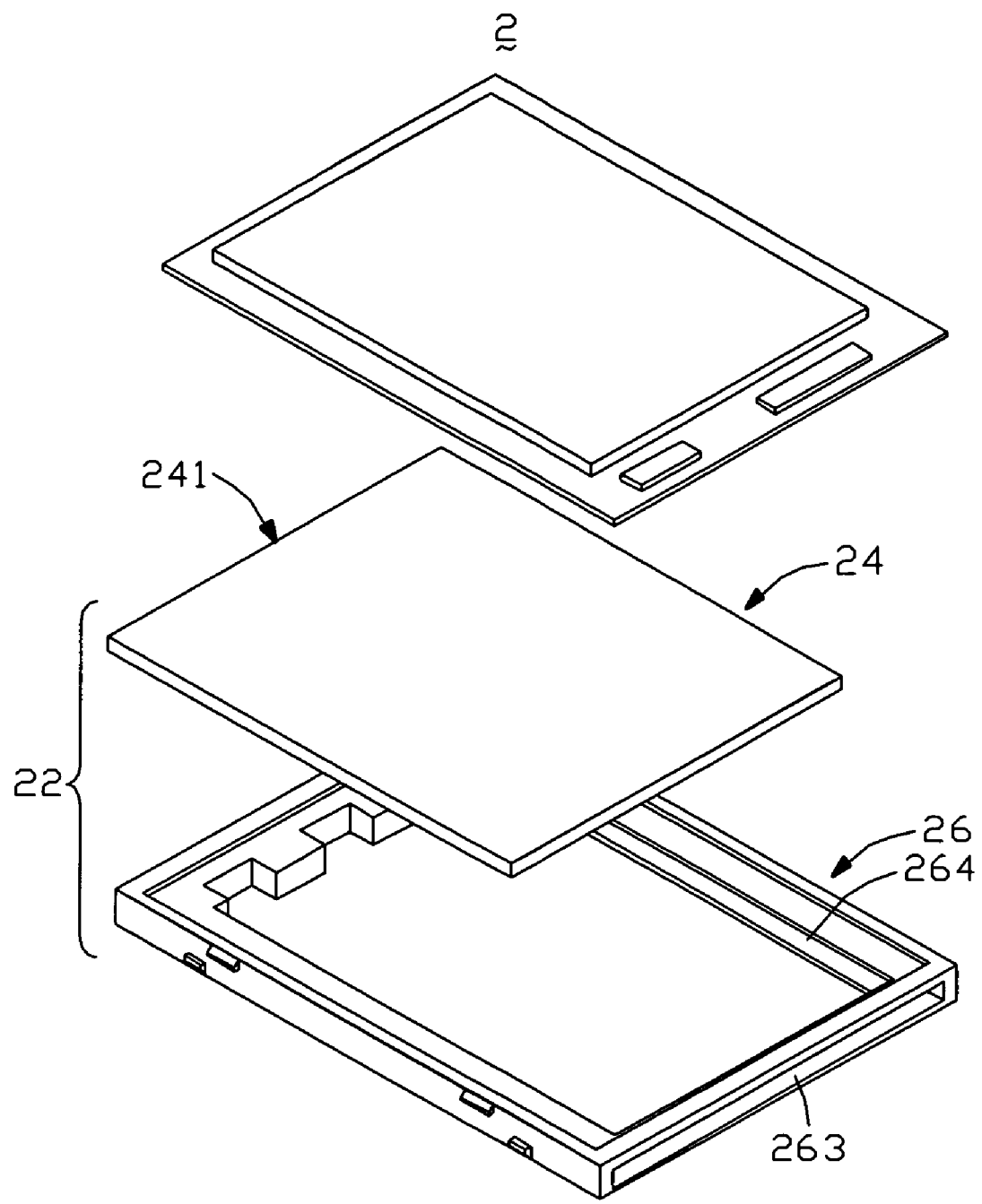
FIG. 2 is an exploded, isometric view of a liquid crystal display according to a second embodiment of the present invention.
Figure 3:
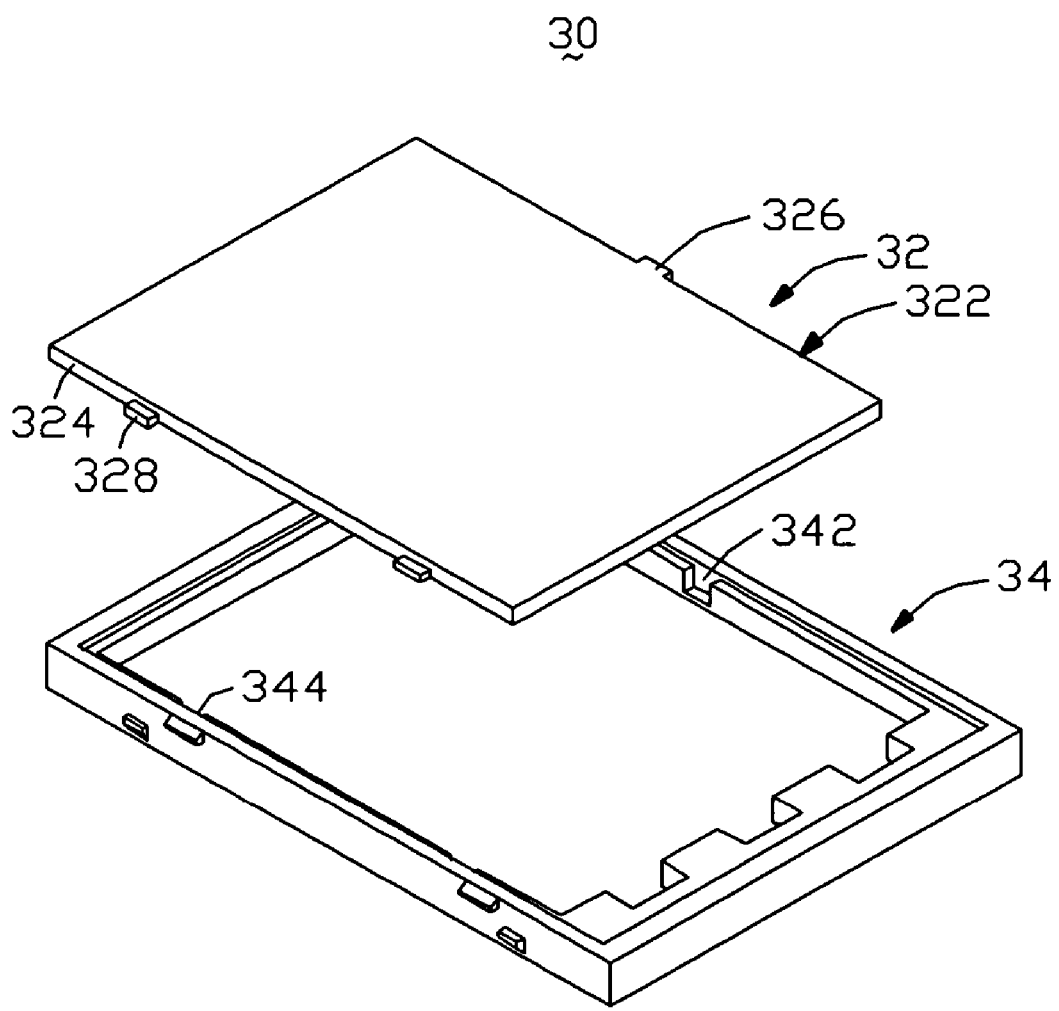
FIG. 3 is an exploded, isometric view of a conventional backlight module.

Referring to FIG. 2, a liquid crystal display 2 according to a second embodiment of the present invention is similar to the liquid crystal display 1. However, a backlight module 22 of the liquid crystal display 2 includes a light guide plate 24, and a frame 26 receiving the light guide plate 24. Side surfaces (not labeled) of the light guide plate 24 are planar. The frame 26 defines a rectangular opening 263 corresponding to a light incident surface 241 of the light guide plate 24. The frame 26 further defines two opposite sliding guides 264 with a same width. A width of each sliding guide 264 is slightly greater than a thickness of the light guide plate 24. That is, edge portions of long sides of the light guide plate 24 can fittingly slide in the respective sliding guides 264. The liquid crystal display 2 can achieve advantages similar to those described above in relation to the liquid crystal display 1.

Further or alternative embodiments may include the following. In one example, the frame defines only one sliding guide adjacent one of the first side wall. In such case, the supporting board has a bottom portion opposite to the sliding guide to support one or more ears of the light guide plate. In a further example, the light guide plate includes only one or more ears outwardly extending from only one side thereof.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
  a light guide plate comprising:
    a top surface from which light beams emit from the light guide plate;
    a bottom surface;
    two side surfaces between the top surface and the bottom surface, the side surfaces being at opposite sides of the light guide plate; and
    a first ear and a second ear respectively extending from the two side surfaces, the second ear being dimensioned less than the first ear as measured along a direction perpendicular to the top surface; and
  a frame receiving the light guide plate, the frame comprising:
    a first side wall with an opening defined therein, the opening configured for allowing the light guide plate to be inserted into the frame therethrough;
    a second side wall and a third side wall respectively connected with the first side wall;
    a first sliding guide defined at an inner side of a portion of the frame that is adjacent to the second side wall, and configured for allowing the first ear to slide there in; and
    a second sliding guide defined at an inner side of a portion of the frame that is adjacent to the third side wall, and configured for allowing the second ear to slide therein, the first sliding guide and the second sliding guide supporting the two opposite sides of the light guide plate and communicating with the opening;
  wherein the opening adjacent to the second sliding guide is dimensioned less than the opening adjacent to the first sliding guide as measured along the direction perpendicular to the top surface such that the frame at the opening adjacent to the second sliding guide blocks the first ear from passing through the opening.

2. The backlight module in claim 1, wherein the light guide plate further comprises a light incident surface connected with the two side surfaces.

3. The backlight module in claim 2, wherein the light incident surface and the opening are located at opposite sides of the backlight module after the backlight module is assembled.

4. The backlight module in claim 3, wherein the frame further comprises a plurality of protrusions located adjacent to the light incident surface.

5. The backlight module in claim 2, wherein the top surface and the bottom surface are connected with the light incident surface.

6. The backlight module in claim 1, wherein the first ear comprises a top portion coplanar with the top surface.

7. The backlight module in claim 1, wherein the second ear is roughly half as thick as the light guide plate.

8. The backlight module in claim 1, wherein a width of the first sliding guide is greater than a thickness of the first ear for allowing the first ear to fittingly slide therein.

9. The backlight module in claim 1, wherein a width of the second sliding guide is greater than a thickness of the second ear for allowing the second ear to fittingly slide therein.

10. The backlight module in claim 1, wherein the two side surfaces are planar.

11. A liquid crystal display comprising:
a liquid crystal panel; and
a backlight module located adjacent to the liquid crystal panel, the backlight module comprising:
  a light guide plate comprising:
    a top surface from which light beams emit from the light guide plate;
    a bottom surface;
    two side surfaces between the top surface and the bottom surface, the side surfaces being at opposite sides of the light guide plate; and
    a first ear and a second ear respectively extending from the two side surfaces, the second ear being dimensioned less than the first ear as measured along a direction perpendicular to the top surface; and
  a frame receiving the light guide plate, the frame comprising:
    a first side wall with an opening defined therein, the opening configured for allowing the light guide plate to be inserted into the frame therethrough;
    a second side wall and a third side wall respectively connected with the fast side wall;
    a first sliding guide defined at an inner side of a portion of the frame that is adjacent to the second side wall, and configured for allowing the first ear to slide therein; and
    a second sliding guide defined at an inner side of a portion of the frame that is adjacent to the third side wall, and configured for allowing the second ear to slide therein, the first sliding guide and the second sliding guide supporting the two opposite sides of the light guide plate and communicating with the opening;
wherein the opening adjacent to the second sliding guide is dimensioned less than the opening adjacent to the first sliding guide as measured along the direction perpendicular to the top surface such that the frame at the opening adjacent to the second sliding guide blocks the first ear from passing through the opening.

12. The liquid crystal display in claim 11, wherein a thickness of the second ear is less than a thickness of the first ear as measured along a direction perpendicular to the top surface.

13. The liquid crystal display in claim 12, wherein a height of the opening adjacent to the second sliding guide is less than a height of the opening adjacent to the first sliding guide as measured along the direction perpendicular to the top surface.

14. The liquid crystal display in claim 13, wherein the height of the opening adjacent to the second sliding guide is such that the frame blocks the first ear from passing through the opening when the light guide plate is slidingly inserted into the frame.

15. A backlight module comprising:
a light guide plate comprising:
  a top surface from which light beams emit from the light guide plate;
  a bottom surface;
  two side surfaces between the top surface and the bottom surface, the side surfaces being at opposite sides of the light guide plate; and
  a first ear and a second ear respectively extending from the two side surfaces, the second ear differing from the first ear; and
a frame receiving the light guide plate, the frame comprising:
  a first side wall with an opening defined therein, the opening configured for allowing the light guide plate to be inserted into the frame therethrough;
  a second side wall and a third side wall respectively connected with the first side wall;
  a first sliding guide defined at an inner side of a portion of the frame that is adjacent to the second side wall, and configured for allowing the first ear to slide therein; and
  a second sliding guide defined at an inner side of a portion of the frame that is adjacent to the third side wall, and configured for allowing the second ear to slide therein, the first sliding guide and the second sliding guide supporting the two opposite sides of the light guide plate and communicating with the opening;
wherein the opening adjacent to the second sliding guide is configured different from the opening adjacent to the first sliding guide such that the light guide plate is able to be assembled into the frame with only a single predetermined orientation, and the first ear is blocked from passing through the opening adjacent to the second sliding guide when the light guide plate is slidingly inserted into the frame.

16. The backlight module in claim 15, wherein at least one of said side walls defines a slot dimensioned in compliance with a thickness of the light guide plate.

17. The backlight module in claim 15, wherein a thickness of the second ear is less than a thickness of the first ear as measured along a direction perpendicular to the top surface.

18. The backlight module in claim 17, wherein a height of the opening adjacent to the second sliding guide is less than a height of the opening adjacent to the first sliding guide as measured along the direction perpendicular to the top surface.

19. The backlight module in claim 18, wherein the height of the opening adjacent to the second sliding guide is such that the frame blocks the first ear from passing through the opening when the light guide plate is slidingly inserted into the frame.

20. The backlight module in claim 19, wherein the frame at the opening adjacent to the second sliding guide constitutes an anti-mismating structure.

* * * * *